United States Patent
Godavarti et al.

(10) Patent No.: US 6,680,090 B2
(45) Date of Patent: *Jan. 20, 2004

(54) POLYOLEFIN WOOD FIBER COMPOSITE

(75) Inventors: Shankar Godavarti, Maplewood, MN (US); Rodney K. Williams, Stacy, MN (US); Michael J. Deaner, Osceola, WI (US)

(73) Assignee: Andersen Corporation, Bayport, MN (US)

( * ) Notice: Subject to any disclaimer, the term of this patent is extended or adjusted under 35 U.S.C. 154(b) by 490 days.

This patent is subject to a terminal disclaimer.

(21) Appl. No.: 09/824,923

(22) Filed: Apr. 3, 2001

(65) Prior Publication Data

US 2001/0019749 A1 Sep. 6, 2001

Related U.S. Application Data

(63) Continuation-in-part of application No. 09/293,618, filed on Apr. 16, 1999, now Pat. No. 6,265,037.

(51) Int. Cl.[7] .............................. E04C 2/26; E06B 1/30
(52) U.S. Cl. ...................... 428/34; 428/35.7; 428/36.9; 428/297.4; 428/52; 428/730.3; 428/730.4
(58) Field of Search .................. 428/34, 35.6, 36.7, 428/36.9, 297.4; 52/730.3, 730.4, 731.2; 525/54.3, 64; 524/13

(56) References Cited

U.S. PATENT DOCUMENTS

| 1,959,375 A | 5/1934 | Loetscher ...................... 18/65 |
| 2,544,019 A | 3/1951 | Heritage ..................... 154/107 |
| 2,715,591 A | 8/1955 | Graham et al. .......... 117/138.8 |
| 2,926,729 A | 3/1960 | Zanini ......................... 160/236 |
| 3,271,239 A | 9/1966 | Hornbostel, Jr. ............ 162/169 |

(List continued on next page.)

FOREIGN PATENT DOCUMENTS

| DE | 195 11 569 C1 | 3/1996 |
| DE | 195 11 579 C1 | 3/1996 |
| EP | 0 008 143 A1 | 2/1980 |
| EP | 0 051 237 A1 | 5/1982 |

(List continued on next page.)

OTHER PUBLICATIONS

Bender, T., "Low–Cost Fibrex™P Formulation DOX", *Aspen Research Corporation*, 7 pages (Feb. 15, 2001).
"Fibrex P Technology Development Project Approach", 13 pages (Date Unknown).
Godavarti, S., "Technologies of Interest in Relation to Fibrex Materials. A Brief Summary of Current Projects Compared to Competition", 5 pages (Date Unknown).
Stropoli, T. et al., "Compounding and Pelletizing Wood Fiber and Polymers with Buss Kneaders", *The Fourth International Conference on Woodfiber–Plastic Companies*, pp. 50–56 (Date Unknown).
"Twin–Screw Compounder ZSK, Development and Processing Technology", *Werner & Pfleiderer*, pp. 1–31 (Date Unknown).

(List continued on next page.)

Primary Examiner—Harold Pyon
Assistant Examiner—Sow-Fun Hon
(74) Attorney, Agent, or Firm—Merchant & Gould P.C.

(57) ABSTRACT

A complex profile made of a composite comprising a polyolefin polymer and a wood fiber. The composite is useful in conventional structural applications. The profile can be used in residential and commercial structures. The profile is used in the manufacture of the fenestration components such as windows and doors. The profile is designed with a cross-sectional shape to form structural elements in the fenestration units that possess sufficient strength, thermal stability and weatherability. The member comprises a hollow cross-section with at least one structural web or one fastener web. The profile can have a visible capstock layer and can be assembled using thermal welding processes.

36 Claims, 3 Drawing Sheets

U.S. PATENT DOCUMENTS

| | | | |
|---|---|---|---|
| 3,432,885 A | 3/1969 | Zanini | 18/13 |
| 3,625,845 A | 12/1971 | Nakayama et al. | 204/159.12 |
| 3,671,615 A | 6/1972 | Price | 264/39 |
| 3,888,810 A | 6/1975 | Shinomura | 260/17.4 BB |
| 3,915,910 A | 10/1975 | Nakano et al. | 260/17.4 R |
| 3,917,901 A | 11/1975 | Jones | 170/110 P |
| 3,943,079 A | 3/1976 | Hamed | 260/17.4 BB |
| 3,962,157 A | 6/1976 | Nakano et al. | 260/17.4 CL |
| 4,003,866 A | 1/1977 | Paturle | 260/17.4 R |
| 4,100,325 A | 7/1978 | Summers et al. | 428/334 |
| 4,157,415 A | 6/1979 | Lindenberg | 428/284 |
| 4,165,302 A | 8/1979 | Armenti et al. | 260/8 |
| 4,176,097 A | 11/1979 | Fox et al. | 260/17.4 BB |
| 4,181,689 A | 1/1980 | Nagatoshi et al. | 525/419 |
| 4,203,876 A | 5/1980 | Dereppe et al. | 260/17.4 |
| 4,210,692 A | 7/1980 | Bohme et al. | 428/106 |
| 4,228,116 A | 10/1980 | Colombo et al. | 264/119 |
| 4,301,047 A | 11/1981 | Jones | 260/17.4 R |
| 4,323,625 A | 4/1982 | Coran et al. | 428/361 |
| 4,328,320 A | 5/1982 | Reszniak et al. | 521/84 |
| 4,379,190 A | 4/1983 | Schenck | 428/95 |
| 4,380,522 A | 4/1983 | Georlette et al. | 264/175 |
| 4,393,020 A | 7/1983 | Li et al. | 264/108 |
| 4,480,061 A | 10/1984 | Coughlin et al. | 524/13 |
| 4,491,553 A | 1/1985 | Yamada et al. | 264/51 |
| 4,542,199 A | 9/1985 | Kaminsky et al. | 526/160 |
| 4,716,062 A | 12/1987 | Klein | 428/36 |
| 4,717,742 A | 1/1988 | Beshay | 523/203 |
| 4,717,743 A | 1/1988 | Wakabayashi et al. | 524/13 |
| 4,731,401 A | 3/1988 | Moteki et al. | 524/271 |
| 4,752,526 A | 6/1988 | Daimon et al. | 428/332 |
| 4,783,493 A | 11/1988 | Motegi et al. | 524/13 |
| 4,820,749 A | 4/1989 | Beshay | 823/203 |
| 5,008,310 A | 4/1991 | Beshay | 524/13 |
| 5,030,662 A | 7/1991 | Banerjie | 521/435 |
| 5,051,222 A | 9/1991 | Marten et al. | 264/143 |
| 5,106,804 A | 4/1992 | Bailly et al. | 502/108 |
| 5,116,889 A | 5/1992 | Gilbert et al. | 524/14 |
| 5,120,696 A | 6/1992 | Tsutsui et al. | 502/113 |
| 5,132,262 A | 7/1992 | Rieger et al. | 502/117 |
| 5,147,722 A | 9/1992 | Koslow | 428/404 |
| 5,153,241 A | 10/1992 | Beshay | 524/8 |
| 5,162,278 A | 11/1992 | Razavi | 502/152 |
| 5,164,432 A | 11/1992 | Dehennau et al. | 524/13 |
| 5,173,230 A | 12/1992 | Colombo | 264/102 |
| 5,186,876 A | 2/1993 | Purstinger et al. | 264/406 |
| 5,215,695 A | 6/1993 | Bortoluzzi et al. | 264/102 |
| 5,217,655 A | 6/1993 | Schmidt | 264/22 |
| 5,346,773 A | 9/1994 | Simoens | 428/476.9 |
| 5,406,768 A | 4/1995 | Giuseppe et al. | 52/730.4 |
| 5,416,139 A | 5/1995 | Zeiszler | 524/13 |
| 5,435,954 A | 7/1995 | Wold | 264/115 |
| 5,441,801 A | 8/1995 | Deaner et al. | 428/326 |
| 5,476,617 A | 12/1995 | English et al. | 264/37 |
| 5,480,602 A | 1/1996 | Nagaich | 264/122 |
| 5,486,419 A | 1/1996 | Clementini et al. | 428/397 |
| 5,486,553 A | 1/1996 | Deaner et al. | 524/13 |
| 5,497,594 A | 3/1996 | Giuseppe et al. | 52/730.4 |
| 5,516,472 A | 5/1996 | Laver | 264/118 |
| 5,518,677 A | 5/1996 | Deaner et al. | 264/142 |
| 5,529,850 A | 6/1996 | Morini et al. | 428/500 |
| 5,536,763 A | 7/1996 | Foran | 524/13 |
| 5,539,027 A | 7/1996 | Deaner et al. | 524/13 |
| 5,541,236 A | 7/1996 | DeNicola, Jr. et al. | 522/157 |
| 5,542,780 A | 8/1996 | Kourgli | 405/55 |
| 5,552,482 A | 9/1996 | Berta | 525/88 |
| 5,567,769 A | 10/1996 | Shine et al. | 525/63 |
| 5,571,864 A | 11/1996 | Bates et al. | 525/88 |
| 5,574,094 A | 11/1996 | Malucelli et al. | 525/54.3 |
| 5,585,317 A | 12/1996 | Sacchetti et al. | 502/111 |
| 5,623,802 A | 4/1997 | Boushek et al. | 52/54.3 |
| 5,624,616 A | 4/1997 | Brooks | 264/83 |
| 5,627,226 A | 5/1997 | Lustiger et al. | 524/90 |
| 5,654,364 A | 8/1997 | Bates et al. | 525/98 |
| 5,691,264 A | 11/1997 | Sacchetti et al. | 502/134 |
| 5,695,874 A | 12/1997 | Deaner et al. | 428/326 |
| 5,698,487 A | 12/1997 | Sacchetti et al. | 502/117 |
| 5,698,642 A | 12/1997 | Govoni et al. | 526/65 |
| 5,709,933 A | 1/1998 | Evans | 428/297.4 |
| 5,710,219 A | 1/1998 | Bates et al. | 525/240 |
| 5,723,522 A | 3/1998 | Bergmann | 524/36 |
| 5,725,939 A | 3/1998 | Nishibori | 428/292.4 |
| 5,731,362 A | 3/1998 | Scheve et al. | 521/142 |
| 5,738,935 A | 4/1998 | Turk et al. | 428/304.4 |
| 5,743,986 A | 4/1998 | Colombo | 156/244.11 |
| 5,759,940 A | 6/1998 | Sacchetti et al. | 502/134 |
| 5,766,395 A | 6/1998 | Bainbridge et al. | 156/222 |
| 5,773,138 A * | 6/1998 | Seethamraju et al. | 428/326 |
| 5,776,281 A | 7/1998 | Evans | 156/244.1 |
| 5,827,607 A | 10/1998 | Deaner et al. | 428/326 |
| 5,938,994 A | 8/1999 | English et al. | 264/102 |
| 5,981,067 A | 11/1999 | Seethamraju et al. | 428/393 |
| 6,015,612 A * | 1/2000 | Deaner et al. | 428/326 |
| 6,051,267 A | 4/2000 | Jury et al. | 426/516 |
| 6,143,811 A | 11/2000 | Oda et al. | 524/13 |
| 6,184,327 B1 | 2/2001 | Weng et al. | 526/351 |
| 6,210,792 B1 * | 4/2001 | Seethamraju et al. | 428/326 |

FOREIGN PATENT DOCUMENTS

| | | |
|---|---|---|
| EP | 0 057 967 A1 | 8/1982 |
| EP | 0 129 368 A1 | 12/1984 |
| EP | 0 185 918 A2 | 7/1986 |
| EP | 0 335 649 A2 | 10/1989 |
| EP | 0 412 750 A2 | 2/1991 |
| EP | 0 412 750 A3 | 2/1991 |
| EP | 0 436 399 A2 | 7/1991 |
| EP | 0 436 399 A3 | 7/1991 |
| EP | 0 447 070 A1 | 9/1991 |
| EP | 0 447 071 A1 | 9/1991 |
| EP | 0 485 820 A2 | 5/1992 |
| EP | 0 485 820 A3 | 5/1992 |
| EP | 0 485 823 A1 | 5/1992 |
| EP | 0 514 594 A1 | 11/1992 |
| EP | 0 540 026 A1 | 5/1993 |
| EP | 0 586 211 A1 | 3/1994 |
| EP | 0 610 619 A1 | 8/1994 |
| EP | 0 586 212 A3 | 9/1994 |
| WO | WO 94/03508 | 2/1994 |
| WO | WO 97/30838 | 8/1997 |
| WO | WO 97/49533 | 12/1997 |
| WO | WO 99/11444 | 3/1999 |
| WO | WO 00/63285 | 10/2000 |

OTHER PUBLICATIONS

Allan, P.S. et al., "The Development and Application of Shear Controlled Orientation Technology", *Iranian J. of Polymer Science and Technology*, 4(1):50–55 (1995).

Avella, M. et al., "Broom Fibers as Reinforcing Materials for Polypropylene–Based Composites", *Journal of Applied Polymer Science*, 68:1077–1089 (1998).

Clemons, C.M. et al., "Microstructure and Dynamic Fracture Toughness of Polypropylene Reinforced with Cellulose Fiber", *ANTEC '98*, pp. 1432–1436 (1998).

Gatenholm, et al., "Methods for improvement of properties of cellulose–polymer composites", Wood Fiber/Polymer Composites: fundamental concepts, processes, and material options, Forest Products Society, 1993, pp. 20–24.

Maier, C. et al., "Polypropylene, The Definitive User's Guide and Databook", Plastics Design Library, 54 pages (1998).
*Modern Plastics International*, pp. 30–31 (Mar. 1996).
*Modern Plastics International*, pp. 30–33 (Oct. 1997).
Titow, W., "PVC Technology," Elsevier Applied Science Publishers LTD., Fourth Edition, pp. 250–251, 254 (1984).

Whelan, A. et al., "Developments In PVC Production And Processing–1," *Applied Science Publishers LTD*, pp. 63–90 (1977).

* cited by examiner

POLYOLEFIN WOOD FIBER COMPOSITE

CROSS-REFERENCE

This application is a continuation-in-part of 09/293,618 filed Apr. 16, 1999, now U.S. Pat. No. 6,265,037.

FIELD OF THE INVENTION

The invention relates to composite materials for structural members used in commercial and residential architecture and specifically in the manufacture or fabrication of fenestration units such as windows and doors. The composite is made using an extrusion process with an input of polyolefin and wood fiber to form a composite material having improved properties. The materials have improved processability, thermal and structural properties when compared to metal, vinyl, or wooden components and when compared to other polymeric or polyolefin composites. The structural members of the invention can be used in the form of elements used in institutional and residential construction such as framing members, beams, sized lumber, trim, siding, shingle, jambs, stiles, sills, tracks, sash and other components. These applications can require a low cost, complex, thin-walled, hollow profile structural member. The composite can be made with intentional recycle of by-product or waste streams comprising components used in the manufacture of the fenestration unit, if desired.

BACKGROUND OF THE INVENTION

In conventional construction materials and in window and door manufacture, vinyl, vinyl composite, wood and metal components are used in forming structural members. Most commonly siding, trim, window or door units are typically made from extruded vinyl or aluminum or milled wood members. Such materials and units made of these materials, require maintenance and are often energy inefficient. Vinyl materials have been used in forming envelopes, profile and seal components in window units. Such vinyl materials typically comprise a major proportion of vinyl polymer with inorganic pigments, fillers, lubricants, etc. Extruded or injection mold of thermoplastic materials have been used, filled and unfilled as flexible and rigid thermoplastic materials used in seals, trims, fasteners, and other window construction parts. Thermoplastic polyvinylchloride has been combined with wood members in the manufacture of PERMASHIELD® brand windows manufactured by Andersen Corporation for many years. The technology is disclosed in Zaninni, U.S. Pat. Nos. 2,926,729 and 3,432,885. Generally, PVC materials are used as a cladding or coating. The PVC technology used in making PERMASHIELD® brand windows involve extruding or injection molding thin polyvinylchloride coating or envelope onto a shaped wooden structural member. One useful alternative to vinyl envelopes around wood members is a polyvinylchloride wood fiber composite such as that disclosed in patents assigned to Andersen Corporation including U.S. Pat. Nos. 5,406,768; 5,441,801; 5,486,553; 5,539,027; 5,497,594; 5,695,874; 5,518,677; 5,827,607 and published European Patent Application No. 586,212, and others.

Polyolefin materials such as polyethylene and propylene, common polyolefin compositions, have been available in a variety of grades and forms for many years. In large part, polypropylene has not been used in exterior applications or as exterior structural members due to its limited structural capacity and its inability to resist the damaging effect of weather, typically heat, light and cold. Recently, polypropylene has been used in a variety of applications in which the polypropylene is combined with a reinforcing composition in a variety of ways. For example, Shinomura, U.S. Pat. No. 3,888,810, teaches a thermoplastic composite comprising a thermoplastic resin, fibrous materials and preferably synthetic or natural rubbers. Jones, U.S. Pat. No. 3,917,901, teaches a conductor having an insulative layer comprising a polyolefin-wood composite. Nakano et al., U.S. Pat. No. 3,962,157, claim a polypropylene composition modified with a porous filler and a free radical agent that promotes reaction between the filler and the polymer. Layer, U.S. Pat. No. 5,516,472, claims an apparatus and method for making a composite, which forms, internally, pellet-like strands that are then recombined to form an extruded part. Bainbridge et al., U.S. Pat. No. 5,766,395, claim a self-supporting composite structure in the form of a panel made by compression molding composite materials. The prior art also discloses a large proportion of patents that compatibilize a combination of a polyolefin with a cellulose filler using such materials as plasticizers, monomeric silicone containing compounds, grafted silyl moieties on either the polymer or the filler, polyolefin lubricants, blends of varied types of polymers in combination with the primary polyolefin, synthetic elastomers and rubbers, methylol phenolic modified polyolefins, blends of ethylene polymers and polypropylene polymers, in situ polymerization of monomers onto a fiber used in the making of a composite, specialized fibers including polytetrafluoroethylene fibers, expanded or otherwise specially modified polyolefins, glyoxal and other types of thermally reactive crosslinking agents, modified cellulosic fibers including the use of metals, crosslinking agents, compatibilizing agents, etc. Wold, U.S. Pat. No. 5,435,954, teaches a molding method for forming a composite into a useful article.

The polypropylene art has shown significant advancement and sophistication in learning to obtain new physical properties from polypropylene, various fibers and reagents or other polymers. Representative examples of recent developments in the manufacture of polypropylene compositions, particularly metallocene catalyst manufactured propylene, is shown in the technical literature owned by Montell North America Inc. For example, Malucelli et al., U.S. Pat. No. 5,574,094, teach improved polyolefin compositions comprising one or more crystalline materials having a melt index higher than 20 grams/10 min combined with a cellulosic particle or fiber. Malucelli et al. disclose pelletizing such a composite and converting such a pellet into products by way of injection molding. Sacchetti et al., U.S. Pat. No. 5,691,264, disclose a bimetallic metallocene catalyst containing at least one M-π bond combined with a support comprising magnesium halide in the gas phase polymerization of an olefin such as propylene into a structural polymeric product. In particular, these catalysts obtain the polymerization of olefins such as propylene into high molecular weight useful materials. The patent literature describes bimetallic catalysts comprising a compound of titanium or vanadium supported on a magnesium halide reactive with a metallocene compound containing at least one cyclopentadienyl ring coordinated on a transition metal selected from V, Ti, Zr, Hf, or mixtures thereof. Examples of such catalysts are described in U.S. Pat. No. 5,120,696, EP-A-447070 and EP-A-447071. The bimetallic catalysts can be obtained by impregnating a silica support with a magnesium compound of the type $MgR_2$, wherein R is a hydrocarbon radical and then reacting the treated support with a compound of Ti, such as $TiCl_4$, optionally with $SiCl_4$ and thereafter with a metallocene compound. Such materials are shown in EP-A-514594. Such bimetallic catalysts obtained by these treamicrometersents and then with other titanocenes such as dicyclopentadienyl titanium dichloride and bis(indenyl) titanium dichloride are shown in EP-A-412750. Similar catalysts obtained by treating carbonated compounds of magnesium such as alkyl magnesium carbonate, with titanium dichloride in the presence of a metallocene compound of Hf or Zr, are known from PCT Application WO 94/03508. Bimetallic catalysts comprising a titanium based catalyst in which the Ti compound is supported on a Mg halide, a metallocene compound and a poly(methylaluminoxane) (a MAO) are disclosed in EP-A-436399. Sacchetti et al., U.S. Pat. No. 5,698,487, disclose additional compositions and methods for preparation of metallocene catalysts for preparing polyolefin materials. Govoni et al., U.S. Pat. No. 5,698,642, disclose a particular gas phase polymerization project having two interconnected polymerization zones for olefin polymerization. Sacchetti et al., U.S. Pat. No. 5,759,940, disclose further information on the preparation of catalytic materials for the manufacture of polyolefin materials. Additional details for manufacturing modern metallocene catalysts are shown in U.S. Pat. No. 4,542,199 and EP-A-129368; EP-A-185918; EP-A-485823; EP-A-485820; EP-A-51237; and U.S. Pat. Nos. 5,132,262; 5,162,278; 5,106,804. The more modern polypropylene polymeric materials show improvement in physical properties when compared to the materials made using the initially formulated Zigler-Natta catalytic materials developed since the early 1960's.

Kourgli, U.S. Pat. No. 5,542,780, discloses a polypropylene composite having an elastic modulus of about 500,000 or less. Coran et al., U.S. Pat. No. 4,323,625, teach a polypropylene composite having 20 wt % of a hardwood pulp and a modulus less than 200,000. Nishibori, U.S. Pat. No. 5,725,939, teaches a wood meal polypropylene composite with 50% polymer and a modulus less than 400,000. Beshay, U.S. Pat. No. 4,717,742, discloses an aspen pulp polypropylene composite having 40 wt % pulp and a tensile modulus less than 100,000. Beshay, U.S. Pat. No. 4,820,749, teaches an aspen pulp polypropylene composite having about 40 wt % pulp and a modulus of less than 100,000. Dehennau et al., U.S. Pat. No. 5,164,432 and Bortoluzzi et al., U.S. Pat. No. 5,215,695, show sawdust containing composites with less than 50 wt % fiber and a modulus less than 800,000. Malucelli et al., EP Application No. 540026, teach a wood flour polypropylene composite having 50 wt % polymer and a modulus less than 700,000. In summary, the prior art relating to polypropylene composites typically uses 50 wt % or less fiber, exhibits a modulus of less than 800,000 and is not particularly descriptive regarding manufacturing process conditions or valuable thermal or structural properties. The industry has not succeeded in manufacturing a high strength and thermally stable composite. The industry has failed to prepare a complex thin-wall profile structural member from polypropylene and a reinforcing fiber that can show structural integrity over the life of a fenestration unit.

A substantial need exists for an improved polyolefin-wood fiber composite structural material that can be extruded into a weatherable, color stable, engineering structural member. Such a structural member requires physical stability, color stability, a controllable coefficient of thermal expansion and sufficient modulus to survive in a construction installation and while exposed to the exterior environment. The composite must be extruded or extrudable into a shape that is a direct substitute in assembly properties and structural properties for a wooden or extruded aluminum member. Such materials must be extrudable into reproducible, stable dimensions and useful cross-sections with a low heat transmission rate, improved resistance to insect attack, improved resistance to water absorption and rot resistance when in use combined with hardness and rigidity that permits sawing, milling and obtains fastening retention properties comparable to wood members and aluminum members. Accordingly, a substantial need exists for further developments in the manufacture of composite members for fenestration units.

BRIEF DISCUSSION OF THE INVENTION

We have found a substantially improved polyolefin wood fiber composite material that when extruded into structural members provide surprisingly improved mechanical properties including: tensile modulus, and mechanical stability (heat deflection) at elevated temperature. Applicants have unexpectedly discovered that "compatibilization" of acicular wood fibers having specified moisture content provides a melt rheology conducive to production of improved extruded, fiber reinforced structural members. A further feature of the invention resides in applicant's recognition that the melt rheology permits use of extrusion tooling (dies, calibration blocks, etc.) designed for a poly (vinylchloride) (PVC) wood fiber composite material also known as FIBREX®. Applicants believe that the superior mechanical properties of the structural members are due to improved wood fiber alignment and fiber-resin compatibilization (wetting).

The polypropylene composite combines about 5 to 50 parts of a polyolefin polyethylene or polypropylene with greater than about 50 to 90 parts of a wood fiber having an aspect ratio greater than about 2 and a fiber size that falls between about 50 microns and about 2000 microns. Preferably the fiber size ranges from about 100 to about 1000 microns and most preferably from about 100 to about 500 microns. The useful polyolefin material is a polyethylene or polypropylene polymer having a melting point of about 140 to 160° C., preferably about 145 to 158° C. and a melt index less than 5 g/10 minor about 0.1 to about 5 g/10 min. The preferred polyethylene material is a polyethylene homopolymer or copolymer with 0.01 to 10 wt. % of a $C_{2-16}$ olefin monomer. The preferred polypropylene material is a polypropylene homopolymer or copolymer with 0.01 to 10 wt % of ethylene or a $C_{4-16}$ olefin monomer or mixtures thereof. The composite is also compatibilized using a compatibilizing agent that improves the wetting of the polymer on the fiber particle. In a preferred mode, the wood fiber is dried as thoroughly as possible. The useful fiber material is dried to a content of less than about 5000 parts, preferably less than 3500 parts of water per each million parts of wood fiber (ppm) resulting in an open cell wood fiber state in which the polypropylene polymer can then wet and penetrate the open cell fiber structure. The combination of these parameters in the composite results in a composite having surprisingly improved structural properties and thermal properties. The polypropylene-wood fiber composite was manufactured in two stages. In the first stage, polypropylene resin and wood fiber were fed into a Krupp Werner and Pfleiderer (W&P) Kombi-Plast™ High-performance Twin-screw Compounder ZSK-30 and pelletized. A vacuum was applied downstream to reduce the final moisture content. Also, another vacuum was applied in the transition box between the twin-screw compounder and the single-screw extruder to further reduce the moisture content and also to lower the temperature. These were called Precursor pellets. In the second stage, the precursor pellets and the compatibilizer were fed directly into the feed port and pelletized. The compounded and pelletized material from the second stage was called the Composite. Both, the biofiber and the resin were added simultaneously for two reasons. One, to minimize fiber degradation in the screw i.e., to maintain the fiber aspect ratio. The resin is allowed to coat the fiber and hence act as a lubricant. Two, incorporating the resin downstream into the hot fiber would result in lowering of temperature and increase the tendency of clumping leading to non-uniform distribution of the fiber within the matrix. In the second stage, the solid compatibilizers were added along with the precursor into the feed port in an initial zone. The two-stage process was also beneficial from a moisture control point of view. More than 95% of the initial moisture was removed in stage 1 of the process. This moisture removal is of umicrometersost importance for increasing the effectiveness of the coupling agents being added in stage 2. The general formulation parameters are as follows for the composite.

TABLE 1

FORMULATIONS (Parts by Weight)

| POLYOLEFIN | COMPATIBILIZER | WOOD FIBER |
|---|---|---|
| 20–50 | 0.01 to 5 | 80–greater than 50 |
| 20–45 | 0.1 to 4 | 80–55 |
| 25–35 | 0.5 to 3 | 75–65 |

Preferred polypropylene is available in different forms including homopolymer, random copolymer and impact copolymers. The ethylene content in random copolymers varies from 2–5% and from 5–8% in impact copolymers. The ethylene portion is responsible for imparting the impact strength while the propylene portion imparts the rigidity. Typical properties of these two types of polymers are given in Table 2. Higher impact strength copolymers tend to lose some stiffness or rigidity. Montell polypropylene random copolymer SV-258 resin was identified and used as the base polymer for all experiments.

We have also developed a weatherable, mechanically stable, thin-walled complex, hollow profile material. The term "thin-walled" contemplates a profile having an open internal hollow structure. The structure is surrounded by a thin wall having a thickness dimension of about 1 to about 10 millimeters, preferably about 2 to 8 millimeters. Any internal support webs or fastener anchor locations have a wall thickness of about 5 to 8 mm. The profile is manufactured from a composite comprising an improved polypropylene polymer composition and wood fiber. The wood fiber is a specially prepared material having controlled moisture content, particle size and aspect ratio. The resulting structural member is extruded into a complex hollow profile having a defined support direction. The modulus of the profile is about $8 \cdot 10^5$ psi. The compressive strength of the profile in the defined support directions greater than about $1.2 \cdot 10^3$ psi. Such profiles can be assembled into a useful unit in institutional or residential real estate construction. The profiles can be joined using a variety of adhesive and welding joining techniques for forming a secure joint between profile members. The modulus of the profile is about 5.5 gigapascals. The compressive strength of the profile in the defined support directions is greater than about 8.8 gigapascals. The profile can optionally include a weatherable capstock material that has a stable color and appearance defined as less than a Delta E value of less than two 2 Hunter Lab units upon 60 months of accelerated weathering as determined by ASTM D2244 Section 6.3 (after exposure per Section 7.9.1.1). Such profiles can be assembled into a useful unit in institutional or residential real estate construction. The profiles can be joined using a variety of adhesive and welding joining techniques for forming a secure joint between profile members. The profile can have a capstock layer with a thickness of about 0.05 to 1 mm, preferably about 0.1 to 0.5 millimeters coextruded on any visible exterior portion or the entire exterior portion of the profile. The capstock can cover greater than 20% of the exterior area, 20 to 80% of the exterior area or virtually 100% of the exterior area, depending on the application of the profile. The profile can have a capstock layer with a thickness of about 0.05 to 1 mm, preferably about 0.1 to 0.5 millimeters coextruded on any visible exterior portion or the entire exterior portion of the profile. The capstock can cover greater than 20% of the exterior area, 20 to 80% of the exterior area or virtually 100% of the exterior area, depending on the application of the profile.

For the purpose of the patent application, the term "aspect ratio" indicates an index number obtained by dividing the length of the fiber by its width. The physical parameters of the materials made in this application are measured using ASTM methods, which are disclosed throughout the application. The term complex profile is intended to mean an extruded thermoplastic article having a hollow internal structure. Such structure includes a complex exterior surface geometry or structure, at least one support web providing mechanical stability in a defined support direction. Alternatively the complex profile structure can comprise one, or more fastener anchor means or locations to improve assembly or installation. The term defined support direction is intended to mean a direction of force or a line of strain opposing the force derived from the environment. Examples of such force includes the force of a step upon a threshold, the force of closing a sash, the force of gravity, wind load forces and forces rising from the anisotropic stress resulting from the non-planar installation of the unit.

DETAILED DISCUSSION OF THE INVENTION

Figure 1:
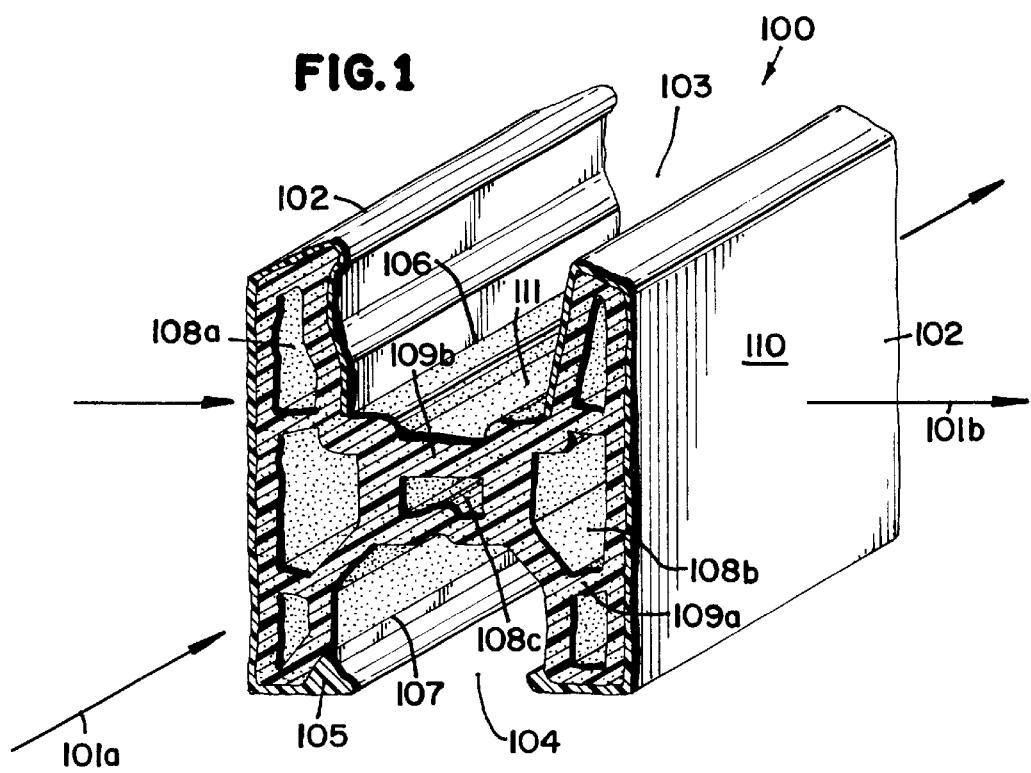
FIG. 1 shows a portion of a extruded complex hollow profile for a window sash. The sash is an extruded polypropylene wood fiber composite having a capstock. The sash has at least two support directions, one for gravity and a second for wind load. The profile comprises a complex external surface features, for glazing and frame, and a complex internal structure.

The invention resides in an advanced composite and in a thin wall complex hollow profile manufactured from a polyolefin preferably polypropylene/wood fiber composite material. The composite has improved mechanical, chemical and weatherability properties rendering it ideal for use in institutional and residential construction materials. The profile can be used in virtually any structural or trim application.

The composite, comprising a polyolefin, preferably polypropylene, combined with the wood fiber materials preferred for use in the invention, have improved impact resistance, improved flexural and tensile moduli, improved heat distortion temperature, and reduced brittle character. Newer polyolefin polyethylenes or polypropylenes are made using metallocene catalyst technology. Metallocene catalysts are typically single sited catalysts (i.e., they have one or more identical active sites per molecule). Such catalyst consistency results in improved molecular weight distribution and stereochemical structure. Syndiotactic polypropylene is now being produced commercially using metallocene catalysts. These catalysts are organometallic compounds with a sandwich-like special arrangement consisting of a transition metal (iron, titanium, zirconium, etc.) situated between two cyclic organic compounds such as a dicyclopentadienyl or a bridged ring structure. The first metallocenes used for polymerization showed activity but the hydrolysis of trimethylaluminum into methylalumoxane resulting in a much more highly active metallocene catalyst. Chiral, bridged metallocene catalysts have also been prepared in catalytic materials that are highly active and selective. Current metallocene catalyst systems commonly use zirconium dichloride ($ZrCl_2$) as the transition metal complex with a cyclopentadiene moiety as the organic compound and an aluminoxane such as MaO as a cocatalyst. The improved polyolefin, polyethylene or polypropylene resins have improved microstructure or crystallinity.

Polyethylenes made using the current metallocene catalyst technology exhibit increased rigidity, uniform molecular structure, improved heat or thermal properties and improved toughness. The improved uniform polyolefin molecular structures have narrow polydispersity or distribution ratios, $M_w \backslash M_n$ of about 2.0. Overall, the improved polyolefin have a melt index of less than about 5 g/10 min, or about 0.1 to 5 g/10 min and all numerical values subsumed therein, or about 1 to about 3 g/10 min and all numerical values subsumed therein and improved processability.

Polypropylenes made using current metallocene catalyst technology exhibit increased rigidity and transparency, higher heat distortion temperature, improved impact strength and toughness even at winter extremes with low extractable residues. Due to the uniformity of the polypropylene chains, metallocene catalyzed polypropylene has a very narrow (compared to Zigler-Natta polypropylene) polydispersity, $M_w \backslash M_n$ of about 2.0. This narrow molecular weight distribution results in low shear sensitivity of the polypropylene resin and provides low melt elasticity, elongation and viscosity in extrusion processes. The melting point of metallocene polypropylene (147–158° C.; 297–316° F.) is generally lower than of conventional Zigler-Natta polypropylene (160–170° C.; 320–338° F.) and can be tailored for specific applications using the appropriate catalyst. The preferred polypropylene materials used for the composites of this invention comprise a polypropylene having a melt index less than about 5 g/10 min, or about 0.1 to 5 g/10 min and all numerical values subsumed therein, or about 1 to about 3 g/10 min and all numerical values subsumed therein and improved extrusion processability.

The improved polyolefin materials of the invention can comprise either a polypropylene copolymer wherein the propylene comprises a major proportion of the polymer combined with a minor proportion (typically less than 50 wt %, most commonly between about 0.1 and 10 wt %) of a second monomer which can comprise ethylene or a $C_{4-16}$ monomer material. Such copolymers often have a melt index of less than about 5 g/10 min, or about 0.1 to 5 g/10 min and all numerical values subsumed therein, or about 1 to about 3 g/10 min and all numerical values subsumed therein and improved processability, flexibility and compatibility. Preferred ethylene copolymers can comprise a major proportion of ethylene and a minor proportion (typically less than 50 wt %, preferably about 0.1 to about 10 wt %) of a $C_{3-18}$ monomer. These polyethylenes similarly have improved properties over the prior art. The following polypropylenes and polyethylene were evaluated in the W&P ZSK-30 screening experiments described hereinbelow to establish the screw configuration and range of operating parameters that yield the inventive composite material. The polypropylenes were: AMOCO PP-10-6015 having a MFI of 0.5 available from AMOCO, and Montell Pro-fax™ SV 258 having a MFI of 1.2, available from Montell. The polyethylene was: MARLEX™ HHM 5502 BN having a MFI of 0.35 available from Phillips Chemical Company.

Wood fiber, in terms of abundance and suitability, can be derived from either soft woods or evergreens or from hard woods commonly known as broadleaf deciduous trees. Soft woods are generally preferred for fiber manufacture because the resulting fibers are longer, contain high percentages of lignin and lower percentages of hemicellulose than hardwoods. While soft wood is the primary source of fiber for the invention, additional fiber make-up can be derived from a number of secondary or fiber reclaim sources including hard woods, bamboo, rice, sugar cane, and recycled fibers from newspapers, boxes, computer printouts, etc. However, the primary source for wood fiber used in the process of this invention comprises the wood fiber by-product of sawing or milling softwoods commonly known as sawdust or milling tailings. Such wood fiber has a regular, reproducible shape and aspect ratio. The fibers based on a random selection of about 100 fibers are commonly greater than 50 micrometers in length, greater than 10 micrometers in thickness and commonly have an aspect ratio of at least 1.8. The fibers are 50 micrometers to 2000 micrometers in length, preferably 100 to 1000 micrometers in length, most preferably about 100 to 500 micrometers in length. Several key characteristics were identified and the following were considered in this study including particle size distribution, moisture content and fiber morphology. Particle size distribution is the most critical variable of all. The fiber aspect ratio influences the final composite properties significantly. Therefore, in order to study this effect, three different wood fiber sizes i.e., less than 140 mesh (80$\mu$), less than 80 mesh (200$\mu$) and standard wood fiber less than 30 but larger than 80 (900 to 200$\mu$), were chosen. Traditionally, Andersen Windows Corp. has been using softwood (loblolly pine wood) and therefore the same species was used in this study. All three wood fiber types had an initial moisture content ranging between 6.7–6.9%.

The preferred fiber for use in this invention are fibers derived from comminuting wood fiber or from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines, which selectively remove wood from the piece leaving the useful shape. Such milling operations produce substantial quantities of sawdust or mill tailing by-products. Lastly, when shaped materials are cut-to-size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite.

Wood fiber, in terms of abundance and suitability, can be derived from either softwoods or evergreens or from hard woods commonly known as broadleaf deciduous trees. Softwoods are generally preferred for fiber manufacture because the resulting fibers are longer, contain high percentages of lignin and lower percentages of hemicellulose than hardwoods. While soft wood is the primary source of fiber for the invention, additional fiber make-up can be derived from any number of available sources such as hardwood fiber ground newsprint, magazines, books, cardboard, wood pulps (mechanical, stone ground, chemical, mechanical-chemical, bleached or unbleached, sludge, waste fines), and various agricultural wastes (rice hulls, wheat, oat, barley and oat chaff, coconut shells, peanut shells, walnut shells, straw, corn husks, corn stalks, jute, hemp, bagasse, bamboo, flax, and kenaf). However, the primary source for wood fiber used in the process of this invention comprises the wood fiber by-product of sawing or milling softwoods commonly known as sawdust or milling tailings. Such wood fiber has a regular, reproducible shape and aspect ratio. The fibers based on a random selection of about 100 fibers are commonly greater than 50 micrometerss in length, greater than 10 micrometerss in thickness and commonly have an aspect ratio of at least 1.8. The fibers are 50 micrometerss to 2000 micrometerss in length, preferably 100 to 1000 micrometerss in length, most preferably about 100 to 500 micrometerss in length. The fibers are 3 to 25 micrometerss in thickness with an aspect ratio between 2 and 50, preferably 2.5 to 40 or as necessary to provide a fiber of useful length.

As disclosed in greater detail hereinbelow, the improved thermal and mechanical properties including impact strength of the inventive structural members increase as lengths of the wood fibers used to prepare the composite material are increased. In the inventive structural members, wood fibers act as reinforcing fibers as opposed to fillers. Applicant's believe that the transition from filler to reinforcing fiber takes place above 80-mesh fiber size. Maximum strength is achieved when the fiber length exceeds the critical load transfer length. In this case, the fiber fails before the polyolefin matrix or the "compatibilized" interface between fiber and matrix. When the fiber length is less than the critical length, failure generally takes place either at the interface or in the continuous polyolefin matrix. The critical load transfer length is described by Stokes and Evens, *Fundamentals of Interfacial Engineering*, Wiley-VCH, New York, (1997), Chapter 7 and Matthews and Rawlings, *Composite Materials: Engineering and Science*, Chapman & Hall, London, (1994), pp 297–321 the disclosures of which are hereby incorporated by reference. Since the desirable thermal and mechanical properties provided by the invention are related to long fibers, it is important to minimize fiber breakage in the various unit operations used to extrude the composite. When over heated wood fibers become brittle and subject to breakage in the shear fields during compounding. As disclosed below, when wood fiber moisture is too high chemical bonding between fiber and compatibilizer is minimized and the improved properties characterizing the invention are not achieved. Therefore wood fiber moisture should be in the range of from 40 to 40,000 ppm, preferably from 100 to 10,000 ppm, and more preferably from 500 to 5,000 ppm, and most preferably from 1,000 to 3,500 ppm.

Coupling, compatibilizing, or mixing agents can be added to the polyolefin material. These additives can be added in an amount of from about 0.01 to about 20 wt %, preferably about 0.1 to about 10 wt % to preferably from about 0.2 to 5 wt % to achieve improvements in the physical, mechanical and thermal characteristics of the materials. Examples include titanium alcoholates, esters of phosphoric, phosphorous, phosphonic and silicic acids, metallic salts and esters of aliphatic, aromatic and cycloaliphatic acids, ethylene/acrylic or methacrylic acids, ethylene/esters of acrylic or methacrylic acid, ethylene/vinyl acetate resins, styrene/maleic anhydride resins or esters thereof, acrylonitrilebutadiene styrene resins, methacrylate/butadiene styrene resins (MBS), styrene acrylonitrile resins (SAN), butadiene-acrylonitrile copolymers and particularly polyethylene or polypropylene modified polymers. Such polymers are modified by a reactive group including polar monomers such as maleic anhydride or esters, acrylic or methacrylic acid or esters, vinylacetate, acrylonitrile, and styrene. Virtually any olefinically reactive residue that can provide a reactive functional group on a modified polyolefin polymer can be useful in the invention. Preferred compatibilizers comprise a polyolefin such as a polyethylene or polypropylene having a molecular weight that ranges from about 5000 to about 100,000. Each polymer of the compatibilizing agent can be modified from about 5 to about 100 residues per mole of the polymer. Preferred compatibilizers comprise either a modified polypropylene or a modified polyethylene modified with maleic anhydride residues. The most preferred compatibilizer comprises a maleic anhydride modified polypropylene. The preferred material has a molecular weight that ranges from about 5000 to about 60,000 and has from about to 50 moles of maleic anhydride per mole of polymer. The composites of the invention can also contain conventional additive materials including lubricants, antioxidants, dyes, stabilizing agents and other materials common for maintaining the molecular weight or stabilizing the overall material to thermal or mechanical degradation. Coupling agents were selected based on their coupling mechanisms. Epolene polymers from EASTMan Chemicals (Epolene-E43, G3003, and G3015) and Questron KA 805 from Montell were identified as the maleic anhydride grafted polypropylene agents. These function through covalent bonding mechanism. Titanate/Zirconate (LICA 12 and LICA 38) based coupling agents from Kenrich Chemicals were identified for their emulsion based compatibilizing mechanism. The parameters of interest in case of Epolene and Questron coupling agents were: Molecular weight and Acid number. In case of LICA 12 and 38, parameters of interest were physical form and particle size and shape.

Coupling, compatibilizing, or mixing agents can be added to the polyolefin material. These additives can be added in an amount of from about 0.01 to about 20 wt %, preferably about 0.1 to about 10 wt % to preferably from about 0.2 to 5 wt % to achieve improvements in the physical, mechanical and thermal characteristics of the materials. Such compatibilizing agent can include both organic and inorganic fillers.

Examples of such fillers include titanium alcoholates, esters of phosphoric, phosphorous, phosphonic and silicic acids, metallic salts and esters of aliphatic, aromatic and cycloaliphatic acids, ethylene/acrylic or methacrylic acids, ethylene/esters of acrylic or methacrylic acid, ethylene/vinyl acetate resins, styrene/maleic anhydride resins or esters thereof, acrylonitrilebutadiene styrene resins, methacrylate/butadiene styrene resins (MBS), styrene acrylonitrile resins (SAN), butadieneacrylonitrile copolymers and particularly polyethylene or polypropylene modified polymers. Such polymers are modified by a reactive group including polar monomers such as maleic anhydride or esters, acrylic or methacrylic acid or esters, vinylacetate, acrylonitrile, and styrene. Virtually any olefinically reactive residue that can provide a reactive functional group on a modified polyolefin polymer can be useful in the invention. Preferred compatibilizers comprise a polyolefin such as a polyethylene or polypropylene having a molecular weight that ranges from about 1000 to about 100,000, preferably 5,000 to about 80,000, more preferably from about 30,000 to about 60,000. Each polymer of the compatibilizing agent can be modified from about 5 to about 100 residues per mole of the polymer, preferably from about 10 to about 50 residues per mole. Preferred compatibilizers comprise either a modified polypropylene or a modified polyethylene modified with maleic anhydride residues. The most preferred compatibilizer comprises a maleic anhydride modified polypropylene having a molecular weight of from about 5000 to about 60,000 and from about 5 to 50 moles of maleic anhydride per mole of polymer.

Applicant's believe that the most preferred maleic anhydride compatibiliziers react (through ring-opening reactions) with hydroxyl groups on the surfaces of the wood fibers to form esters linkages that chemically bond the compatibilizer to the surface of the reinforcing wood fiber. Chemical bonding contributes to the improved thermal and mechanical properties of structural members derived from the composite material by maximizing fiber-matrix interface shear strength (as disclosed by Stokes and Evens, supra). Since excess moisture can prematurely hydrolyze the anhydride ring to maleic acid before the formation of ester linkages, bonding is not effective in the presence of excessive amounts of moisture. On the other hand, when the wood fibers are over heated they become brittle and tend break during compounding and extrusion processing to form both the precursor (also known as masterbatch) and finished composite used to form the structural members. As disclosed above, when the fiber length drops below the critical length it acts as a filler instead of a reinforcing fiber degrading the improved thermal and mechanical properties characteristic of the inventive structural members. In summary, the improved thermal and mechanical properties observed in the inventive structural members results when the wood fiber reinforcing properties are maximized (fiber length exceeds the critical load transfer length), compatibilizer chemically bonds wood fiber to a portion of the polyolefin matrix (maximizing-fiber matrix interface shear strength), and wood fiber moisture is in the preferred range during the unit operations used to extrude the composite material used in the structural members.

Compatibilizers are necessary to improve the strength of the composite material. The natural incompatibility between the two phases; hydrophilic wood-fiber with the hydrophobic polymer matrix results in a weak interface between the fiber and the matrix. Further, the presence of strong intermolecular hydrogen bonds between the fibers leads to poor dispersion of the fibers in the matrix. Coupling these two materials through chemical bonding is an effective way in overcoming these problems.

The polypropylene compositions of the invention, in particular, a capstock layer coextruded onto the surface of all or a portion of the polypropylene composite profile can contain a colorant or pigment. Colorants are pigments or dyes. Dyes are commonly organic compound soluble in the plastic forming a neutral molecular solution. They produce bright intense colors and are transparent. Pigments are generally insoluble in the plastic. The color results from the dispersion of fine particles (in the range of about 0.01 to about 1 $\mu$m) throughout the resin. They produce opacity or at least some translucence in the final product. Pigments can be organic or inorganic compounds and are viable in a variety of forms including dry powders, color concentrates, liquids and precolor resin pellets. Most common inorganic pigments include oxides, sulfides, chromates, and other complexes based on heavy metal such as cadmium, zinc, titanium, lead, molybdenum, iron and others. Ultamarines are typically sulfide-silicate complexes containing sodium and aluminum. Often pigments comprise mixtures of two, three or more oxides of iron, barium, titanium, antimony, nickel, chromium, lead, and others in known ratios. Titanium dioxide is a widely used and known bright white thermally stable inorganic pigment. Organic pigments are also known including azo or diasazo pigments, pyrazolone pigments, and others including permanent red 2B, nickel azo yellow, litho red, and pigment scarlet. The preferred reinforcing fiber for the polypropylene composite profiles of the invention is wood fiber. However, other reinforcing fibers are useful in practicing the invention. Such fibers include but not limited to other cellulosic or natural fibers, for example, cotton, wool, jute, kenaf, bamboo; synthetic fibers for example, polyester, aramide (NYLON™); inorganic fibers (chopped or long), for example, glass fibers, carbon fiber, ceramic fibers.

The composition may also contain conventional components: fillers for example, titanium dioxide, silica, alumina, silica/alumina, silica/magnesia, calcium silicate, talc, calcium carbonate, barium/calcium sulfate, mica, Wollastonite, Kaolin, glass beads, glass flakes, glass microspheres, ceramic microspheres (Zeeospheres™) and the like; lubricants such as higher fatty acids and paraffin waxes; oxidation stabilizers; UV stabilizers; antistatic agents; antioxidants; fire retardants; dyes; pigments; plasticizers; mold release agents; extrusion mold release agents and the like. These additive components can be blended and introduced into the extruder device with the polymer materials.

Capstocks useful in practicing the invention are available under the tradename ASTRYN™ from Montell.

Formulations

A preferred polyolefin wood fiber formulation for use in this invention is shown in Table 2:

TABLE 2

FORMULATIONS (Parts by Weight)

| Polyolefin MONTELL Profax ™ (SV258) | COMPATIBILIZER | WOOD FIBERS |
|---|---|---|
| 20 to 50 | 0.01 to 5 | 80 to greater than 50 |
| 20 to 45 | 0.1 to 4 | 80 to 55 |
| 25 to 35 | 0.5 to 3 | 75 to 65 |

Wood fibers were prepared pine fiber; moisture 50,000 to 70,000 ppm on fiber; fiber length 100–500 micrometers with an aspect ratio about 2 to 5.

Extrusion Processing

The following description of the blending of the formulations, extrusion of the materials and formation of the materials in an appropriate thin walled hollow profile die is an understanding of the processing conditions required for making a successful complex hollow profile structure.

The preferred polypropylene wood fiber composite materials are useful in forming stable high strength structural members.

The following examples illustrate the advances made in structural properties including tensile modulus and Gardener impact and an improvement in heat properties such as heat distortion temperature and coefficient of thermal expansion. The examples illustrate the invention and suggest the best mode.

Screening Experiments.

A series of thermoplastic polymers including the specific polyolefins disclosed hereinabove were evaluated in a series of screening experiments to elucidate the broad outlines of the process parameters required to produce the inventive compatibilized (well-wetted) composite material. As disclosed hereinabove, the W&P Kombi-Plast ZSK-30 was selected to make composite pellets suitable as feedstocks for profile extruders, such as the Cincinnati Milacron CM80 for example. By "trial and error" ZSK process parameters were adjusted until the process yielded the data shown in Tables 3–10 for the various Montell Pro-fax™ SV-258 polypropylene wood fiber composite materials.

Preparation of Examples

A series of polypropylene wood fiber composite materials were prepared. Polymer in Table 2 was used with wood fiber in an extruder. Extrusion conditions are shown below. The first pass extrusion without compatibilizer was made to incorporate the polymer and wood fiber into a thermoplastic composite. The initial composite was then blended with a compatibilizer material and a second extrusion pass (the conditions are shown below) to form a composite material that was tested for its structural and heat behavioral properties. In Examples 1 through 7, about 70 parts of wood fiber was combined with about 30 parts of polypropylene. The wood fiber had a particle size of between 100 and 1000 microns and either a reactive organic compatibilizer or a reactive organometallic compatibilizer was used. In Example 1, 8 and 15, no compatibilizer was used. In Example 2, 9 and 16, a 9000 $M_w$ molecular weight polypropylene with about 45 maleic anhydride units per mole was used as a compatibilizer (EASTMan E43). In Examples 3, 10 and 17, a similar compatibilizer was used except the molecular weight was 52000 and the maleic acid number was 8 (EASTMan G3003). In Examples 4, 11 and 18, a similar compatibilizer was used except the molecular weight was 47000 and the maleic acid number was 15 (EASTMan G3015). In Examples 5, 12 and 19, the MFI was 50 g/10 min (Montell KA805) and the maleic acid content was 1 mole %. In Examples 6, 7, 13, 14, 20 and 21, a titanate, LICA12, LICA38 compatibilizer was used.

TABLE 3

Polymer/Wood Fiber = 30/20, Fiber About 100 to 1000 micrometers
3200 ppm Water

| EXAMPLE | First Pass (Control) | 1 | 2 | 3 | 4 | 5 | 6 | 7 |
|---|---|---|---|---|---|---|---|---|
| Tensile Modulus ($\times 10^5$) | — | 6.45 | 8.23 | 9.12 | 11.26 | 8.21 | 7.26 | 8.2 |
| Gardener Impact (in-lbs.) | 15.4 | 17 | 12.5 | 12.5 | 16.5 | 8.8 | — | — |

TABLE 3-continued

Polymer/Wood Fiber = 30/20, Fiber About 100 to 1000 micrometers
3200 ppm Water

| EXAMPLE | First Pass (Control) | 1 | 2 | 3 | 4 | 5 | 6 | 7 |
|---|---|---|---|---|---|---|---|---|
| HDT 268 (psi @_° C.) | — | 93 | — | — | — | — | — | — |

TABLE 4

Polymer/Wood Fiber = 30/20, Fiber About 150 to 1000 micrometers
3200 ppm Water

| EXAMPLE | Control | 8 | 9 | 10 | 11 | 12 | 13 | 14 |
|---|---|---|---|---|---|---|---|---|
| Tensile Modulus ($\times 10^5$) | — | 7.9 | 7.9 | 11.0 | 7.5 | 8.3 | 6.4 | 8.4 |
| Gardener Impact (in-lbs.) | 18.2 | 13.5 | 10.5 | 13.7 | 26.1 | 17.5 | — | — |
| HDT 268 (psi @_° C.) | — | 88 | — | — | — | — | — | — |

TABLE 5

Polymer/Wood Fiber = 30/20, Fiber About 150 to 500 micrometers
3200 ppm Water

| EXAMPLE | Control | 15 | 16 | 17 | 18 | 19 | 20 | 21 |
|---|---|---|---|---|---|---|---|---|
| Tensile Modulus ($\times 10^5$) | — | 8.1 | 9.2 | 8.1 | 10.1 | 7.6 | 10.0 | 7.06 |
| Gardener Impact (in-lbs.) | 11.8 | 10.2 | 12.5 | 12.8 | 25.7 | 12.5 | 11.1 | 7.5 |
| HDT 268 (psi @_° C.) | — | 90 | 130 | — | — | — | — | — |

An examination of the data of Tables 3–5 indicates that a careful selection of polypropylene and wood fiber content, an appropriate compatibilizer at an optimum concentration and a preferred wood fiber size, an aspect ratio produces a surprisingly useful composite. The control and first passed materials without compatibilizer have tensile modulus that ranges from about $3.3 \times 10^{-5}$ to about $8 \times 10^{-5}$ while the materials of the invention achieve a tensile modulus that exceeds $10.0 \times 10^5$. A substantial increase and a modulus that is sufficient to provide an indication that the materials are sufficiently stable in a structural mode to withstand the rigors of manufacture, installation and use. Further, the unmodified materials have a Gardener impact that is, at most, about 12 in-lbs. The compatibilized materials have a Gardener impact that exceeds 12 and achieves an impact strength of greater than 20 in-lbs. Further, the thermal properties of these materials are surprising. The heat distortion temperature of the first passed control materials and the materials of Examples 1, 8 and 15 have a heat distortion temperature of less than about 90° C. The heat distortion temperature of Example 16 is 130° C. showing a substantial improvement in thermal properties. In summary, the thermal properties and other than Gardener impact structural properties of these materials are clearly surprising when compared to prior art polypropylene composites.

DETAILED DESCRIPTION OF THE FIGURES

FIG. 1 shows a cross-section of an extruded sash profile 100. The complex hollow profile, or structural member has a complex surface feature or features, is covered with a capstock 102 coextruded onto the exterior of the profile 100 on all exposed or visible surfaces. The interior surface 110 contains the capstock 102 layer. In a window sash, the common loads experienced by the sash is a load caused by the force of gravity and a separate important load caused by wind loadings. The support direction of the wind load 101b and the support direction for the gravity load 101a is exerted onto the profile. The extruded profile 100 is used in the manufacture of sash window structures by incorporating a glass unit into a surface feature comprising a window location 103 wherein it is adhesively installed. The sash is installed in a frame in which the sash can move vertically on a frame guide. The sash is inserted on the frame guide (not shown) using a surface feature comprising a sash area 104 and weatherstrip 105 to form a weather-tight sliding area. The capstock 102 is not extruded to cover the entirety of the profile. The uncovered composite material 111 is shown on the profile with no capstock layer. The edge 106 of the capstock 102 covers the composite material 111 but reveals the composite material at an edge 106 or 107. The hollow profile is made with internal hollow areas 108a, 108b and 108c within the profile defining the dimension of the thin walled hollow profile structure 100. The hollow profile additionally comprises support webs 109a and 109b within the profile 100 providing support in the wind load direction.

Figure 2:
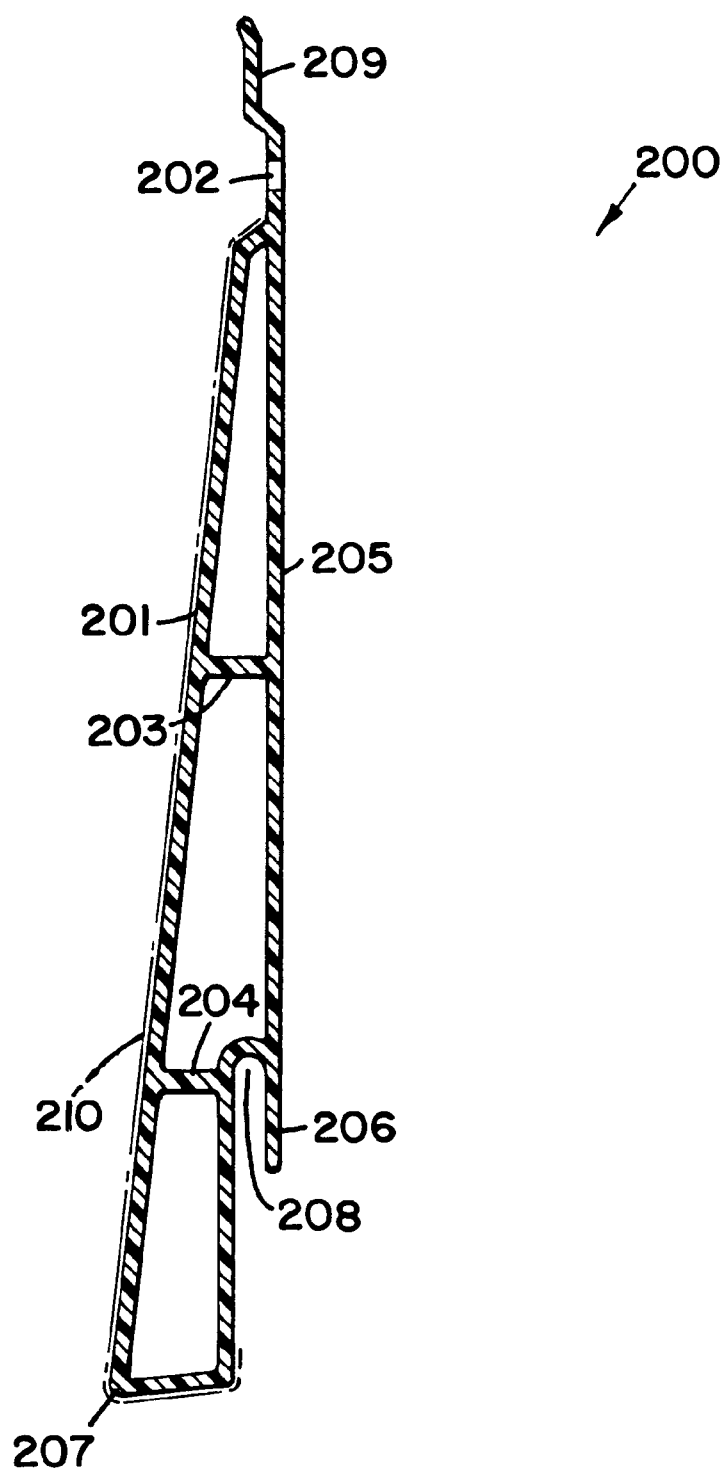
FIG. 2 shows a cross-section of a second extruded complex hollow profile for a residential siding component. The siding component is an extruded polypropylene wood fiber composite that can have a capstock if needed on the exterior surface. The siding unit requires impact strength to resist the effects of impact in the horizontal direction and also requires sufficient structural integrity to survive installation.

FIG. 2 shows a cross-section of a typical thin walled complex hollow profile structure that can be used as a siding member in residential construction. The siding member 200 is typically installed by placing the member on a rough building surface by contacting the installation site 205 of the member 200 with the installation surface. The member 200 is then attached by inserting a fastener such as a screw through fastener aperture 202. Adhesives can also be used to affix the siding member 200 onto the rough surface in contact with side 205. The member 200 is designed to appear to be standard wood based clapboard siding. The appearance of a complete installation comprising multiple courses of siding members 200 reveal only the clapboard side 201 to the observer. Clapboard side 201 can have a capstock layer 210 if needed. When installed, a starter course of the siding 200 is installed on the entire length of a rough side. A second course is then installed in which installation edge 205 is inserted into a space 208 defined by flange 206 and base 207, which interlocks to form a tight structural siding unit. The siding unit 200 comprises a thin walled complex profile extrusion due to the presence of the internal structural webs 203 and 204 and as a result of the installation edge 209 and the installation space 208 defined by base 207 with 206.

Figure 3:
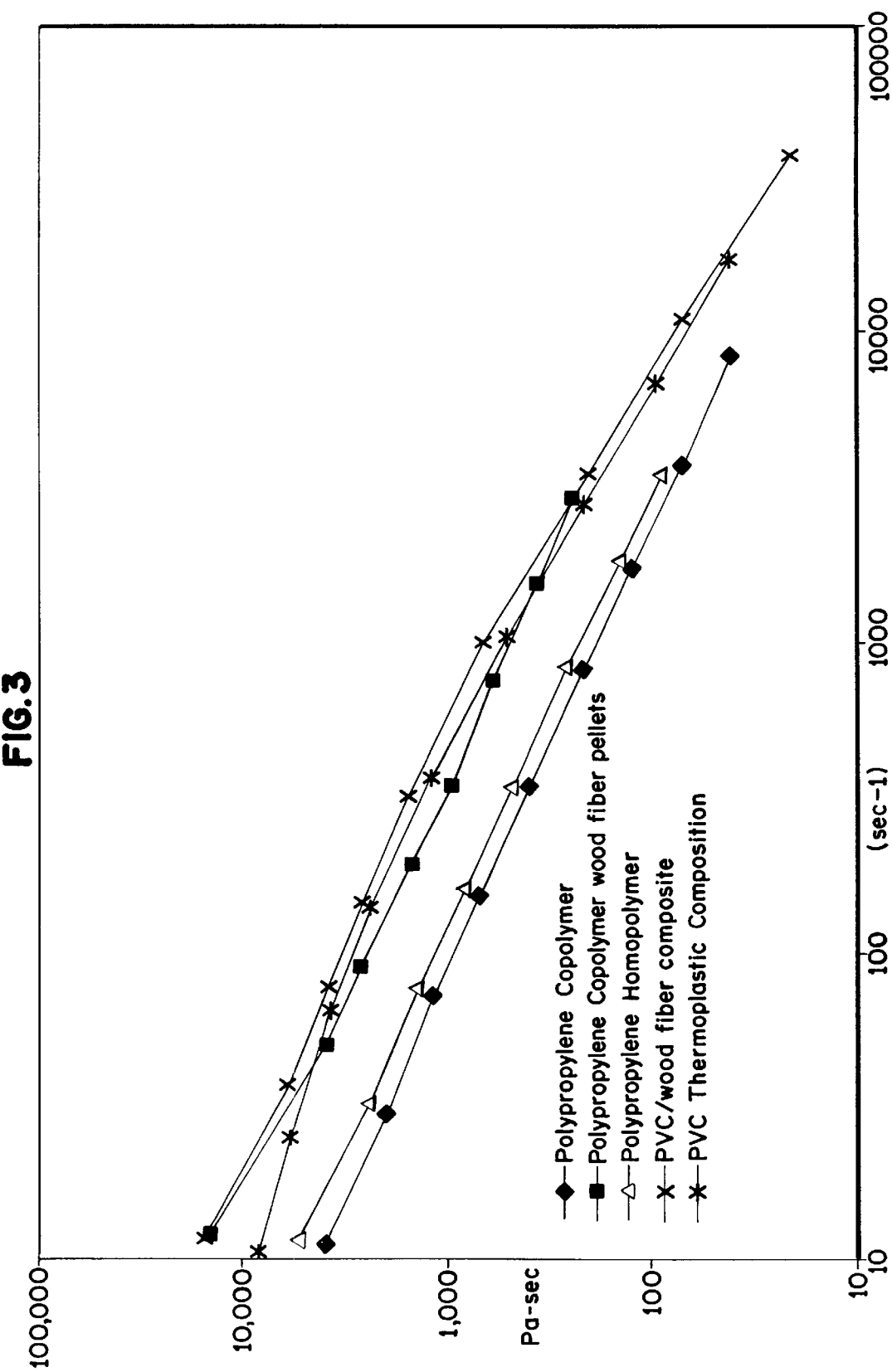
FIG. 3 shows a log-log plot demonstrating the surprising melt flow properties, i.e. the viscosity measured using a capillary rheometer at 193° C., of the polypropylene wood fiber composite. The data show that combining a major proportion of fiber with a polypropylene thermoplastic component provides melt flow and viscosity similar to known production parameters for profile extrusion with a PVC wood fiber composite in which the composite comprises about 60 parts by weight of PVC and about 40 parts by weight of wood fiber. Even with the use of substantially different proportions of materials, a useful and extrudable thermoplastic material results. This melt flow viscosity lends itself to extrusion using well-understood temperature and pressure profiles.

FIG. 3 shows a log-log plot of the melt flow viscosity determined by capillary rheomentry, which measures viscosity as a function of temperature and shear rate. The data shown in FIG. 3 were measured at a constant temperature of 193° C. The viscosity measured in Pascal-seconds is displayed on the ordinate, and the shear rate in reciprocal seconds is displayed on the abscissa. The measurements were made in accord with ASTM D3835, Standard Test Method for Determination of Properties of Polymeric Materials by means of a Capillary Rheometer. The instrument used for the measurement was a Goettfert Rheo-Tester 1000 Capillary Rheometer capable of direct measurement of melt-pressures through a side mounted pressure transducer. The test parameters were as follows: temperature precision +/−0.1° C., die inner diameter 1 mm, die length 20 mm, die entry angle 180° C., initial pressure 0 MPa, barrel diameter 12 mm, dwell time 6 min, Rabinowitsch data correction was applied. The data demonstrates the surprising melt flow characteristics of the polypropylene copolymer composite materials. Melt flow viscosity of the polypropylene homopolymer and copolymer is quite similar and is shown in FIG. 3 and identified as the lower pair of lines in the melt flow exhibit. The melt flow characteristics of the homopolymer and copolymer are compared to the melt flow characteristics of a PVC thermoplastic composition. This PVC composition is free of wood fiber and has substantially different melt flow characteristics as shown by the substantially different location of the plot of the melt flow properties of the materials. Surprisingly, the melt flow characteristics of the polypropylene wood fiber composite is substantially similar to the melt flow properties of the polyvinylchloride resin material and is substantially similar to the PVC wood fiber composite materials. Based on our experience with the PVC wood fiber composite, we expected the melt flow properties of the material to be more similar to the melt flow properties of the polypropylene material shown in FIG. 3. The similarities in melt flow properties of the polypropylene copolymer wood fiber pellets, PVC/wood fiber composite, and PVC Thermoplastic composition are surprising.

The tensile strength, tensile modulus, Gardener impact, and oxidation induction time (OIT) results were tested. The composition of the composite studied is 30% polypropylene and 70% wood fiber. Tensile strength and tensile modulus increase with increase in wood fiber size. The tensile strength values for 140 mesh, 80 mesh and −30/+80 wood fiber sizes are, 1525 psi, 2030 psi and 3390 psi, respectively. Similarly, the modulus increases from 552,450 psi to 813,000 psi. This is due to the fact that the fiber length exceeds the critical length about 0.5 to 1 mm, preferably about 0.9 to 1 mm required for a reinforcing fiber. We believe this transition takes place above 80-mesh fiber size. Fiber lengths below this size tend to behave more as fillers rather than reinforcing fibers. The effect of wood fiber size on impact strength is important. Impact strength was measured using Gardener Impact test at room temperature. With increasing fiber size, composite impact strength decreased. This because larger fiber size provides a higher stress concentration where the crack can be initiated easily. The impact strength for 140 mesh and −30/80 mesh is 17 in-lbs and 10 in-lbs, respectively. OIT experiments were carried out under two conditions—air and oxygen. The OIT decreased from 101 min to 28 min as fiber size was increased from 140 mesh to −30/80 in air. This is because with increasing wood fiber size, the volume of unfilled regions within polymer increases and the residual gases present help accelerate the degradation. However, this phenomena would need to be confirmed further. The density of the composite did not follow any trends. The density values varied around 1.1±0.1 g/cc for all wood fiber sizes. This because the wood fiber is compressed to a maximum density during compounding, that can be sustained by the cell walls. Since the cell wall density is independent of particle size, the final density of all fiber sizes is same.

Heat distortion temperature was tested. The HDT increases from 95° C. to 105° C. as fiber size is increased from 140 mesh to −30/+80 mesh.

Viscosity was measured using RDA II, an oscillatory rheometer. Moisture present, if any, was seen to behave as an internal lubricant and thus lowering the viscosity. Brabender fusion bowl was also used to test the effect of moisture on torque. With an increase in fiber size, torque values are lowered. The decrease in torque with increasing fiber size supports the theory of increasing volume of unfilled regions within the polymer and the behavior of moisture as an internal lubricant. The data also shows the effect of moisture content within a given fiber size. In case of 140 mesh, lowering the initial moisture content from 4000 ppm to 2400 ppm, increased the equilibrium torque by 75%.

Different types of compatibilization mechanisms were used to couple the wood fiber to the polymer backbone. The list of compatibilizers used and their characteristics can be found below:

TABLE 5A

| Coupling Agent/ Property | E 43 | G3003 | G3015 | KA 805 |
|---|---|---|---|---|
| Acid number | 45 | 8 | 15 | 1% by wt |
| Mol. Wt (Mw) | 9100 | 52000 | 47000 | xxx |
| Density (g/cc) | 0.93 | 0.91 | 0.91 | 0.9 |
| Viscosity (cP) | 400 | 60000 | 25000 | xxx |
| MFI (g/10 m) | | | | 50 |

Of these, the Epolene (EASTMan Chemicals) and Questron (Montell) compatibilizers are maleic anhydride grafted polypropylenes (MA-g-PP) and these couple the wood fiber to the polymer backbone through esterification reaction. The hydroxyl groups of cellulose and lignin link to the anhydride groups of the MA-g-PP through the formation of primary linkage i.e., esters or through secondary linkages i.e., hydrogen bonding. Epolene coupling agents are: E43, G3003, G3015. The two variables of interest among these compatibilizers are; molecular weight and functionality. Functionality is expressed as an acid number of the polymer and is indicative of the number of active sites present on the coupling agent for bonding to the wood fiber. The molecular weight is indicative of the degree of the entanglement that can occur between the coupling agent and the polymer. In general therefore, a higher molecular weight and a high acid number coupling agent are desirable.

It was seen that with increasing molecular weight of the Epolene coupling agents, physical properties including tensile strength and modulus, flexural strength and modulus increased and impact strength increased (Table 1). The molecular weight of Epolene coupling agents increases in the order: E43<G3015<G3003, while the acid number follows the opposite trend. In case of 140 mesh and −30/80 mesh wood fiber sizes, increasing the molecular weight from 9100 to 47000 increased the tensile modulus from around 920,000 psi to over a 1000,000 psi. The effectiveness of Epolene coupling agents can be attributed to increased wet ability of wood fiber by polypropylene matrix, improved dispersion and better adhesion between the two phases. The strong intermolecular fiber-fiber hydrogen bonding is diluted leading to better dispersion of the fibers. Studies have shown that hydrogen bonds are decreased when the hydroxyl groups in cellulose are esterified. The physical properties improved almost by a factor of 3x over the base material (i.e., composite having no compatibilizers). Thermal properties also showed an increase of nearly 40–50% over the base material. Of all the MA-g-PP agents, Epolene G 3015 was seen to provide the best combination of properties. This compatibilizer has the ideal combination of a high molecular weight and a relatively high acid number.

Titanate and zirconate coupling agents (Kenrich Petrochemicals, Inc) were also evaluated. These function by modifying the surface of the fiber enabling it to bond to the polymer. Two coupling agents were evaluated. These were: LICA 12 and LICA 38. These were fed separately along with precursor pellets into the feed throat simultaneously. Of the two titanate coupling agents used, LICA 38 was found to be better than LICA 12. However, overall their performance in increasing the composite physical properties was not significant. Addition of these coupling agents lowered impact strength. The tensile and flexural properties improved marginally only at longer fiber lengths. The advantages are its reduced torque resulting in higher feedrates. The disadvantages include pre-blending and careful handling.

TABLE 6

Comparative Properties of Commercial Montell polypropylenes

| Property | Impact copolymer | Random Copolymer |
|---|---|---|
| Melt flow (g/10 m) | 2.0 | 1.2 |
| Tensile elongation (psi) | 8 | 10 |
| Flexural modulus (psi) | 140000 | 180000 |
| Notched izod impact (ft-lb/in) | No break | 3.0 |
| Tensile strength (psi) | 3200 | 4000 |
| HDT (F, 264 psi) | 180 | x |

In the following Tables 7–10 composites are prepared as described above. Tables 7–9 show processing conditions while Table 10 shows the properties of the resulting composite.

TABLE 7

80 mesh fiber

| Sample | Compatibilizer | Feedrate (lb/hr) | Screw Speed (rpm) | % Torque | SME (kJ/kg) | Vacuum | BT (zone 1–5) (° C.) |
|---|---|---|---|---|---|---|---|
| 1 | None | 40 | 250 | 50 | 450 | 4 | 146-156-172-164 |
| 2 | E 43 | 40 | 250 | 50 | 450 | 4 | 147-166-168-162 |
| 3 | G 3003 | 40 | 250 | 50 | 450 | 4 | 146-141-169-161 |
| 4 | G 3015 | 40 | 250 | 47 | 423 | 4 | 149-152-172-163 |
| 5 | KA 805 | 40 | 250 | 51 | 459 | 4 | 148-151-170-163 |
| 6 | Lica 12 | 40 | 450 | 37 | 600 | x | 141-144-165-155 |
| 7 | Lica 38 | 40 | 450 | 36 | 584 | x | 142-158-159-153 |
| 8 | PR8515 | 40 | 250 | 64 | 577 | x | 146-149-165-161 |

| Sample | Screw Temp (° C.) | Screw Speed (rpm) | Barrel Temp (° C.) | Melt Temp (° C.) | Die Temp (° C.) | Die Pressure (psi) | Cutter Speed Setting |
|---|---|---|---|---|---|---|---|
| 1 | 150 | 67 | 150 | 160 | 161 | 1380–1390 | 6 |
| 2 | 150 | 66 | 149 | 153 | 161 | 1200–1360 | 6 |
| 3 | 150 | 66 | 150 | 152 | 160 | 1320–1350 | 6 |
| 4 | 150 | 66 | 149 | 153 | 160 | 1260–1580 | 6 |
| 5 | 150 | 66 | 149 | 153 | 161 | 1390–1450 | 6 |

TABLE 7-continued

80 mesh fiber

| 6 | 150 | 67 | 144 | 230 | 158 | 1390–1480 | 6 |
| 7 | 150 | 66 | 145 | 154/225 | 156 | 1340–1390 | 8 |
| 8 | 150 | 60 | 144 | 207 | 156 | 770–1530 | 6.5 |

TABLE 8

140 Mesh Fiber

| Sample | Compatibilizer | Feedrate (lb/hr) | Screw Speed (rpm) | % Torque | SME (kJ/kg) | Vacuum | BT (zone 1–5) (° C.) |
|---|---|---|---|---|---|---|---|
| 9 | None | 40 | 250 | 46 | 414 | 5 | 149-152-161-168 |
| 10 | E 43 | 40 | 250 | 44 | 396 | 5 | 146-153-163-170 |
| 11 | G 3003 | 40 | 250 | 49 | 441 | 4 | 145-157-173-165 |
| 12 | G 3015 | 40 | 250 | 48 | 432 | 4 | 148-153-170-164 |
| 13 | KA 805 | 40 | 250 | 50 | 450 | 4 | 147-155-171-164 |
| 14 | Lica 12 | 40 | 450 | 37 | 600 | x | 141-142-158-151 |
| 15 | Lica 38 | 40 | 450 | 36 | 584 | x | 141-143-157-155 |

| Sample | Screw Temp (° C.) | Screw Speed (rpm) | Barrel Temp (° C.) | Melt Temp (° C.) | Die Temp (° C.) | Die Pressure (psi) | Cutter Speed Setting |
|---|---|---|---|---|---|---|---|
| 9 | 150 | 60 | 151 | 154 | 150 | 1250–1540 | 6 |
| 10 | 150 | 63 | 150 | 153 | 156 | 970–1140 | 6 |
| 11 | 150 | 65 | 149 | 150 | 161 | 1330–1390 | 6 |
| 12 | 150 | 65 | 150 | 151 | 161 | 1350–1420 | 6 |
| 13 | 150 | 65 | 150 | 151 | 161 | 1375–1385 | 6 |
| 14 | 150 | 66 | 148 | 230 | 158 | 1060–1230 | 6 |
| 15 | 150 | 60 | 144 | 153 | 156 | 1220–1250 | 8 |

TABLE 9

−30 +80 Mesh Fiber

| Sample | Compatibilizer | Feedrate (lb/hr) | Screw Speed (rpm) | % Torque | SME (kJ/kg) | Vacuum | BT (zone 1–5) (° C.) |
|---|---|---|---|---|---|---|---|
| 16 | None | 40 | 250 | 47 | 423 | 8 | 149-151-170-162 |
| 17 | E 43 | 40 | 250 | 46 | 414 | 4 | 149-149-168-161 |
| 18 | G 3003 | 40 | 250 | 50 | 450 | 4 | 149-150-170-161 |
| 19 | G 3015 | 40 | 250 | 50 | 450 | 4 | 147-152-173-164 |
| 20 | KA 805 | 40 | 250 | 50 | 450 | 4 | 151-146-168-160 |
| 21 | Lica 12 | 40 | 450 | 37 | 600 | x | 141-146-171-156 |
| 22 | Lica 38 | 40 | 450 | 34 | 551 | x | 142-143-158-153 |

| Sample | Screw Temp (° C.) | Screw Speed (rpm) | Barrel Temp (° C.) | Melt Temp (° C.) | Die Temp (° C.) | Die Pressure (psi) | Cutter Speed Setting |
|---|---|---|---|---|---|---|---|
| 16 | 150 | 66 | 151 | 154 | 160 | 1310–1370 | 6 |
| 17 | 149 | 66 | 149 | 154 | 161 | 1010–1230 | 6 |
| 18 | 150 | 66 | 150 | 153 | 161 | 1220–1240 | 6 |
| 19 | 150 | 66 | 151 | 152 | 162 | 1290 | 6 |
| 20 | 150 | 66 | 149 | 148 | 163 | 1220–1380 | 6 |
| 21 | 150 | 66 | 145 | (230 from T) | 158 | 1400 | 6 |
| 22 | 150 | 65 | 124/151 | 148/220 | 156 | 950–1380 | 6 |

TABLE 10

Effect of wood fiber and compatibilizers on PP-WF composites

| Compat-ibilizer | Tensile Strength (psi) | Tensile Modulus (psi) | Gardener impact (in-lb) | HDT (° C., 264 psi) | Flexural Modulus (psi) | Flexural Strength (psi) |
|---|---|---|---|---|---|---|
| Wood fiber: | 400 to 900μ 700μ | | | | | |
| −30/+80 | ave.. | | | | | |
| None | 3390 | 813000 | 10.2 | 90 | 686000 | 4930 |
| E 43 | 4300 | 920000 | 12.5 | 136 | 699000 | 7300 |

TABLE 10-continued

Effect of wood fiber and compatibilizers on PP-WF composites

| Compat-ibilizer | Tensile Strength (psi) | Tensile Modulus (psi) | Gardener impact (in-lb) | HDT (° C., 264 psi) | Flexural Modulus (psi) | Flexural Strength (psi) |
|---|---|---|---|---|---|---|
| G 3003 | 4600 | 810000 | 12.8 | 128 | 726000 | 7930 |
| G 3015 | 5600 | 1013000 | 25.7 | 133 | 630000 | 9350 |
| KA 805 | 4400 | 765000 | 12.5 | 136 | 707000 | 7300 |
| Lica 12 | 1420 | 999000 | 11.1 | x | 376000 | 2500 |
| Lica 38 | 2100 | 706000 | 7.5 | x | 598000 | 4000 |
| Wood fiber - 80 mesh | About 200µ | | | | | |
| None | 2030 | 792000 | 13.5 | 88 | 498000 | 3700 |
| E 43 | 5050 | 797000 | 10.5 | 133 | 735000 | 8640 |
| G 3003 | 5060 | 1098000 | 13.7 | 125 | 674000 | 8630 |
| G 3015 | 6200 | 753000 | 26.1 | 135 | 636000 | 11000 |
| KA 805 | 4730 | 830000 | 17.5 | 132 | 726000 | 8350 |
| Lica 12 | 1775 | 639000 | 14.6 | x | 554000 | 3200 |
| Lica 38 | 2420 | 840000 | 7.4 | x | 724000 | 4400 |
| Wood Fiber 140 mesh | About 100µ | | | | | |
| None | 1525 | 645000 | 17 | 93 | 475000 | 3000 |
| E 43 | 3910 | 823000 | 12.5 | 124 | 664000 | 6800 |
| G 3003 | 3690 | 912000 | 12.5 | 132 | 691000 | 6494 |
| G 3015 | 4960 | 1126000 | 16.5 | 131 | 665000 | 9000 |
| KA 805 | 3240 | 821000 | 8.8 | 116 | 661000 | 5700 |
| Lica 12 | 2100 | 726000 | 12.9 | x | 597000 | 3900 |
| Lica 38 | 2350 | 820000 | 11.4 | x | 672000 | 4400 |

The above results of physical property testing of the compatibilizer polypropylene wood fiber composites show a significant advantage in tensile modulus and flexural modulus. The composites achieve 800,000 to 1.0 million psi tensile modulus and 700,000–800,000 flexural modulus. High Gardener Impact values are achieved along with excellent heat distortion temperatures ranging from about 125 to 140° C. at 264 psi. Such a result is a substantial improvement over prior art composites and over composites with conventional polymer technology.

TABLE 11

| Property | Instrument | Method ASTM |
|---|---|---|
| Tensile properties | Instron | D 3039 |
| Flexural properties | Instron | D 790 |
| Impact strength | Gardener | D 4226 |
| Heat Distortion Temp | Aspen hot air oven | D696 |
| Rheological | RDA-II oscillatory rheometer | |
| Density | Pycnometer | |

While the above discussion, examples and data provide a means for understanding the operability of the invention, the invention can be made in a variety of formats without departing from the spirit and basic scope of the inventive concept. Accordingly, the invention is found in the claims hereinafter appended.

We claim:

1. A weatherable, mechanically stable thin walled complex profile comprising, a composite comprising:
(a) greater than about 25 wt % of a polyolefin polymer composition having a melt index of less than about 5 gm/10 min a melting point of about 145° C. to about 158° C.; and
(b) greater than about 50 up to about 75 wt % of a wood fiber, the fiber having a moisture content of less than about 5000 parts of water per million parts of the profile, a particle size of about 100 to about 2000 µm and an aspect ratio of about 1:2 to about 1:5;
wherein the profile comprises an extruded complex hollow member having a defined support direction and a wall thickness of less than about 5 mm, the tensile modulus of the profile is greater than about $5 \cdot 10^5$ psi, the heat distortion temperature of the profile in the defined support direction is greater than about 75° C. at about 264 psi (ASTM D 648).

2. The profile of claim 1 wherein the composite comprises a compatibility polyolefin wherein the polyolefin is a maleic anhydride grafted polyolefin, with 1 to 100 moles maleic anhydride per mole of polyolefin, the tensile modulus is at least about $8 \cdot 10^5$ psi.

3. The profile of claim 1 wherein the polyolefin polymer is polypropylene and the tensile modulus is at least about $10 \cdot 10^5$ psi.

4. The profile of claim 1 selected from the group consisting of a sill, a jamb, a stile, or a rail.

5. A unit comprising at least two profiles of claim 1 with a secure joint between the profiles.

6. The unit of claim 5 wherein the joint is formed by thermal welding.

7. The profile of claim 4 having a capstock layer with a thickness of about 0.05 to about 1 mm.

8. The profile of claim 2 wherein the compatibilizer polyolefin comprises a polyolefin having a molecular weight ($M_w$) of about 5000 to about 100,000 and about 1 to 100 moles of maleic anhydride per mole of polymer.

9. The profile of claim 8 wherein the polyolefin is polypropylene.

10. The profile of claim 1 wherein the wood fibers having a moisture content of about 5 to about 3200 ppm, a particle size of about 100 to about 800 micrometers.

11. The profile of claim 1 wherein the polyolefin polymer has a melt flow of about 1 to about 3 g/10 min.

12. A weatherable, mechanically stable and thermally stable polymer fiber composite comprising:
(a) greater than about 25 wt % of a polyolefin polymer composition having a molecular weight distribution $M_w/M_n$ of less than 6, a melt index of less than about 5 gm/10 min, a melting point of about 145° C. to about 158° C.;
(b) greater than about 50 up to about 75 wt % of a wood fiber, the wood fiber having a particle size of about 100 to about 2000 µm, less than about 5000 ppm water and the wood fiber having an aspect ratio of about 1:2 to about 1:5; and
(c) about 1 to about 5 wt % of a polymer/fiber compatibilizer;
wherein the composite comprises an extruded composite that comprises a tensile modulus greater than about $8 \cdot 10^5$ psi, and a compressive strength of greater than about 1200 psi.

13. The composite of claim 12 wherein the composite comprises a compatibilizer that comprises a polyolefin having a molecular weight ($M_w$) of about 5000 to 100,000 and about 1 to about 100 moles of maleic anhydride per mole of polymer.

14. The composite of claim 12 having a tensile modulus of at least about $10 \times 10^5$ psi.

15. The composite profile of claim 12 having a tensile modulus of at least about $12 \times 10^5$ psi.

16. The composite of claim 12 wherein the wood fiber comprises a particle size of about 100 to about 2000 micrometers.

17. The composite of claim 12 wherein the wood fiber comprises a moisture content of about 1 to about 3500 ppm and a particle size of about 100 to about 800 micrometers.

18. The composite profile of claim 12 wherein the polyolefin polymer is a polypropylene has a melt flow of about 1 to about 3 g/10 min.

19. The composite of claim 12 wherein the polyolefin polymer comprises poly(propylene-co-ethylene) having about 0.1 to about 10 wt % ethylene.

20. A weatherable, mechanically stable thin walled complex hollow profile comprising, mechanically stable and thermally stable polymer/fiber composite profile comprising:

(a) about 25 to about 40 wt % of a polypropylene polymer composition having a melt index of less than about 5 g/10 min, a melting point of about 148 to about 158° C., an ethylene content of about 0.1 to about 10 wt %;

(b) about 65 to about 75 wt % of a wood fiber, a particle size of about 150 to about 800 micrometers and an aspect ratio of about 1:2 to about 1:5; and (c) about 0.1 to about 5 wt % of a polymer fiber compatibilizer comprising a polypropylene polymer having a molecular weight of about 5000 to about 50,000 having grafted thereto maleic anhydride in an amount of about 15 to about 50 moles of maleic anhydride per mole of polymer composition;

wherein the profile comprises an extruded complex hollow member having a defined support direction the tensile modulus of the composite is greater than about $8·10^5$ psi, the HDT of the profile in the defined support direction is greater than about 135° C. at about 264 psi(ASTM648).

21. A fenestration unit comprising a structural profile or member, the member comprising a composite comprising:

(a) greater than about 25 wt % of a polyolefin polymer composition having a melting point of about 145° C. to 158° C.; and a melt index of less than 5;

(b) greater than about 50 up to 75 wt % of a wood fiber, the fiber having a moisture content of less than 5000 parts of water per million parts of the profile, a particle size of about 100 to about 2000 µm and an aspect ratio of about 1:2 to about 1:5;

wherein the profile comprises an extruded complex hollow member having a defined support direction and a wall thickness of less than about 5 mm, the tensile modulus of the profile is greater than about $5·10^5$ psi, the heat distortion temperature of the profile in the defined support direction is greater than about 75° C. at 264 psi (ASTM D 648).

22. The unit of claim 21 wherein the unit comprises a window.

23. The unit of claim 21 wherein the unit comprises a double hung window.

24. The unit of claim 22 wherein the unit comprises a casement window.

25. The unit of claim 21 wherein the unit comprises a door.

26. The unit of claim 25 wherein the unit comprises an entry door.

27. The unit of claim 25 wherein the unit comprises a sliding glass door.

28. The unit of claim 25 wherein the unit comprises a storm door.

29. A fenestration unit comprising a thermoplastic polymer and wood fiber composite composition in the form of a structural profile or member, the thermoplastic composite composition comprising:

(a) greater than about 25 wt % of a polyolefin polymer composition having a melting point of about 145° C. to 158° C.; and a melt index of less than 5

(b) greater than about 50 up to 75 wt % of a wood fiber, the fiber having a moisture content of less than 5000 parts of water per million parts of the profile, a particle size of about 100 to about 2000 µm and an aspect ratio of about 1:2 to about 1:5;

wherein the profile comprises an extruded complex hollow member having a defined support direction and a wall thickness of less than about 5 mm, the tensile modulus of the profile is greater than about $5·10^5$ psi, the heat distortion temperature of the profile in the defined support direction is greater than about 75° C. at 264 psi (ASTM D 648).

30. The unit of claim 29 wherein the unit comprises a window.

31. The unit of claim 30 wherein the unit comprises a double hung window.

32. The unit of claim 30 wherein the unit comprises a casement window.

33. The unit of claim 29 wherein the unit comprises a door.

34. The unit of claim 33 wherein the unit comprises an entry door.

35. The unit of claim 33 wherein the unit comprises a sliding glass door.

36. The unit of claim 33 wherein the unit comprises a storm door.

* * * * *

UNITED STATES PATENT AND TRADEMARK OFFICE
CERTIFICATE OF CORRECTION

PATENT NO. : 6,680,090 B2
DATED : January 20, 2004
INVENTOR(S) : Godavarti et al.

It is certified that error appears in the above-identified patent and that said Letters Patent is hereby corrected as shown below:

<u>Column 22,</u>
Line 39, "polymer fiber" should read -- polymer/fiber --
Line 63, delete the word "profile"

<u>Column 23,</u>
Line 4, delete the word "profile"

<u>Column 24,</u>
Line 21, "less than 5" should read -- less than 5; and --

Signed and Sealed this

Third Day of August, 2004

JON W. DUDAS
*Acting Director of the United States Patent and Trademark Office*